United States Patent
Song et al.

(10) Patent No.: US 10,206,186 B2
(45) Date of Patent: Feb. 12, 2019

(54) APPARATUS AND METHOD FOR CONTROLLING TRANSMISSION FOR DEVICE TO DEVICE (D2D) COMMUNICATION BASED ON TRANSMIT POWER TO A BASE STATION

(71) Applicant: Samsung Electronics Co., Ltd., Suwon-si, Gyeonggi-do (KR)

(72) Inventors: Seong-Wook Song, Seoul (KR); Hyung-Jong Kim, Seongnam-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/220,756

(22) Filed: Mar. 20, 2014

(65) Prior Publication Data

US 2015/0050929 A1   Feb. 19, 2015

(30) Foreign Application Priority Data

Aug. 14, 2013   (KR) .................. 10-2013-0096815

(51) Int. Cl.
*H04W 52/14*   (2009.01)
*H04W 52/16*   (2009.01)
(Continued)

(52) U.S. Cl.
CPC ......... *H04W 52/383* (2013.01); *H04W 52/16* (2013.01); *H04W 76/14* (2018.02);
(Continued)

(58) Field of Classification Search
CPC .... H04W 52/383; H04W 76/14; H04W 52/16
See application file for complete search history.

(56) References Cited

U.S. PATENT DOCUMENTS 6,504,863 B1 * 1/2003 Hellmark ............. H03M 1/129
                                                                341/139
2005/0047366 A1 * 3/2005 Ghosh .................. H04L 1/0003
                                                                370/329
(Continued)

FOREIGN PATENT DOCUMENTS

CN      102883438 A      1/2013
CN      103079262 A      5/2013
(Continued)

OTHER PUBLICATIONS

Version listing for Technical Standard 3GPP 36.213, available at https://portal.3gpp.org/desktopmodules/Specifications/SpecificationDetails.aspx?specificationId=2427.*
(Continued)

*Primary Examiner* — David Orange
(74) *Attorney, Agent, or Firm* — Jefferson IP Law, LLP

(57) ABSTRACT

A method for operating a User Equipment (UE) is provided to minimize performance degradation due to a difference between a transmit power for D2B communication and a transmit power for Device to Device (D2D) communication. The method includes transmitting a signal for D2B communication to a Base Station (BS) and a signal for D2D communication to another UE in a first time period, and configuration for the D2D communication, when it is determined there is a difference between a transmit power for the D2B communication and a transmit power for the D2D communication.

8 Claims, 13 Drawing Sheets

(51) Int. Cl.
*H04W 52/26* (2009.01)
*H04W 52/36* (2009.01)
*H04W 52/38* (2009.01)
*H04W 76/14* (2018.01)

(52) U.S. Cl.
CPC ........ *H04W 52/146* (2013.01); *H04W 52/262* (2013.01); *H04W 52/265* (2013.01); *H04W 52/367* (2013.01)

(56) References Cited

U.S. PATENT DOCUMENTS

| | | | |
|---|---|---|---|
| 2005/0208973 A1* | 9/2005 | Iochi | H04L 1/0026 455/561 |
| 2006/0153181 A1* | 7/2006 | Wu | H04L 1/0069 370/389 |
| 2008/0065944 A1* | 3/2008 | Seol | H04L 18/12 714/748 |
| 2008/0069062 A1* | 3/2008 | Li | H04W 52/265 370/338 |
| 2010/0023830 A1* | 1/2010 | Wengerter | H04L 1/0025 714/748 |
| 2010/0067367 A1* | 3/2010 | Choi | H04L 5/0064 370/210 |
| 2010/0093364 A1* | 4/2010 | Ribeiro et al. | 455/452.2 |
| 2010/0195575 A1 | 8/2010 | Papasakellariou et al. | |
| 2011/0275382 A1* | 11/2011 | Hakola et al. | 455/452.2 |
| 2012/0269072 A1* | 10/2012 | Wu et al. | 370/242 |
| 2012/0281611 A1 | 11/2012 | Zhang et al. | |
| 2013/0230032 A1 | 9/2013 | Lu et al. | |
| 2015/0124737 A1* | 5/2015 | Lee | H04W 52/28 370/329 |
| 2016/0174242 A1 | 6/2016 | Fujishiro et al. | |

FOREIGN PATENT DOCUMENTS

| | | |
|---|---|---|
| CN | 103190196 A | 7/2013 |
| KR | 10-1041759 B1 | 6/2011 |
| WO | 2012/049351 A1 | 4/2012 |

OTHER PUBLICATIONS

"Demystifying Modulation and Coding Scheme (MCS) Index Values," Darren Gauntlett, Sep. 11, 2012, Digital Air Wireless, available at http://www.digitalairwireless.com/wireless-blog/recent/demystifying-modulation-and-coding-scheme-index-values.html.*

Ericsson, "In-band Interference Modeling for D2D", 3GPP, Apr. 15-19, 2013, pp. 1-8, 3GPP TSG-RAN WG1 #72bis, R1-131622.

Qualcomm Inc., "Remaining Details of D2D performance evaluation", 3GPP, Aug. 19-23, 2013, pp. 1-3, 3GPP TSG-RAN WG1 #74, R1-133601.

Chinese Office Action with English translation dated Sep. 17, 2018; Chinese Appln. No. 201480045317.5.

* cited by examiner

APPARATUS AND METHOD FOR CONTROLLING TRANSMISSION FOR DEVICE TO DEVICE (D2D) COMMUNICATION BASED ON TRANSMIT POWER TO A BASE STATION

CROSS-REFERENCE TO RELATED APPLICATION(S)

The present application claims the benefit under 35 U.S.C. § 119(a) of a Korean patent application filed on Aug. 14, 2013 in the Korean Intellectual Property Office and assigned Serial number 10-2013-0096815, the entire disclosure of which is hereby incorporated by reference.

TECHNICAL FIELD

The present disclosure relates to transmission control in a wireless communication system.

BACKGROUND

Device to Device (D2D) communication indicates direct signal transmission and reception between mobile stations without passing a base station. The D2D communication allows the communication between the adjacent mobile stations using standard or resource allocated by the base station without passing the base station. The D2D communication is contrasted with cellular communication. The cellular communication indicates communication between the base station and the mobile station and is referred to as D2B communication.

FIG. 1 depicts the D2D communication in a cellular network according to related art.

Referring to FIG. 1, a User Equipment 1 (UE1) 121 and a User Equipment 2 (UE2) 122 may be paired for their D2D communication and concurrently connected to a Base Station (BS) 110. The UE1 121 and the UE2 122 may be paired for the D2D communication and are connected to the BS 110 through first D2B connection and second D2B connection respectively, and concurrently establish the D2D connection between them. The UE1 121 and the UE2 122 may communicate with the BS 110 for a service over an external network, and communicate with each other directly using the D2D connection to transmit data, rather than transmitting the data over the existing cellular network.

The single UE may hold both of the D2D connection and the D2B connection as shown in FIG. 1. In this case, while the transmit power for each connection is independently determined based on a distance to the BS or the UE, the transmit power of one connection may affect the communication quality of the other connection. Thus, an effective control method is demanded.

Accordingly, an apparatus and a method for reducing influence between a transmit power for D2B communication and a transmit power for Device to Device (D2D) communication in a wireless communication system is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for reducing influence between a transmit power for D2B communication and a transmit power for Device to Device (D2D) communication in a wireless communication system.

Another aspect of the present disclosure is to provide an apparatus and a method for minimizing performance degradation caused by a difference between a D2B communication distance and a D2D communication distance in a wireless communication system.

Another aspect of the present disclosure is to provide an apparatus and a method for increasing a transmit power for D2D communication in a wireless communication system.

Another aspect of the present disclosure is to provide an apparatus and a method for lowering a Modulation and Coding Scheme (MCS) level for D2D communication in a wireless communication system.

In accordance with an aspect of the present disclosure, a method for operating a User Equipment (UE) for supporting Device to Device (D2D) communication in a wireless communication system is provided. The method includes transmitting a signal for D2B communication to a Base Station (BS) and a signal for D2D communication to another UE in a first time period, wherein a configuration for the D2D communication is determined based on a difference between a transmit power for the D2B communication and a transmit power for the D2D communication.

In accordance with another aspect of the present disclosure, an apparatus of a UE for supporting D2D communication in a wireless communication system is provided. The apparatus includes a transmitter configured to transmit a signal for D2B communication to a Base Station (BS) and a signal for D2D communication to another UE in a first time period, wherein a configuration for the D2D communication is determined based on a difference between a transmit power for the D2B communication and a transmit power for the D2D communication.

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
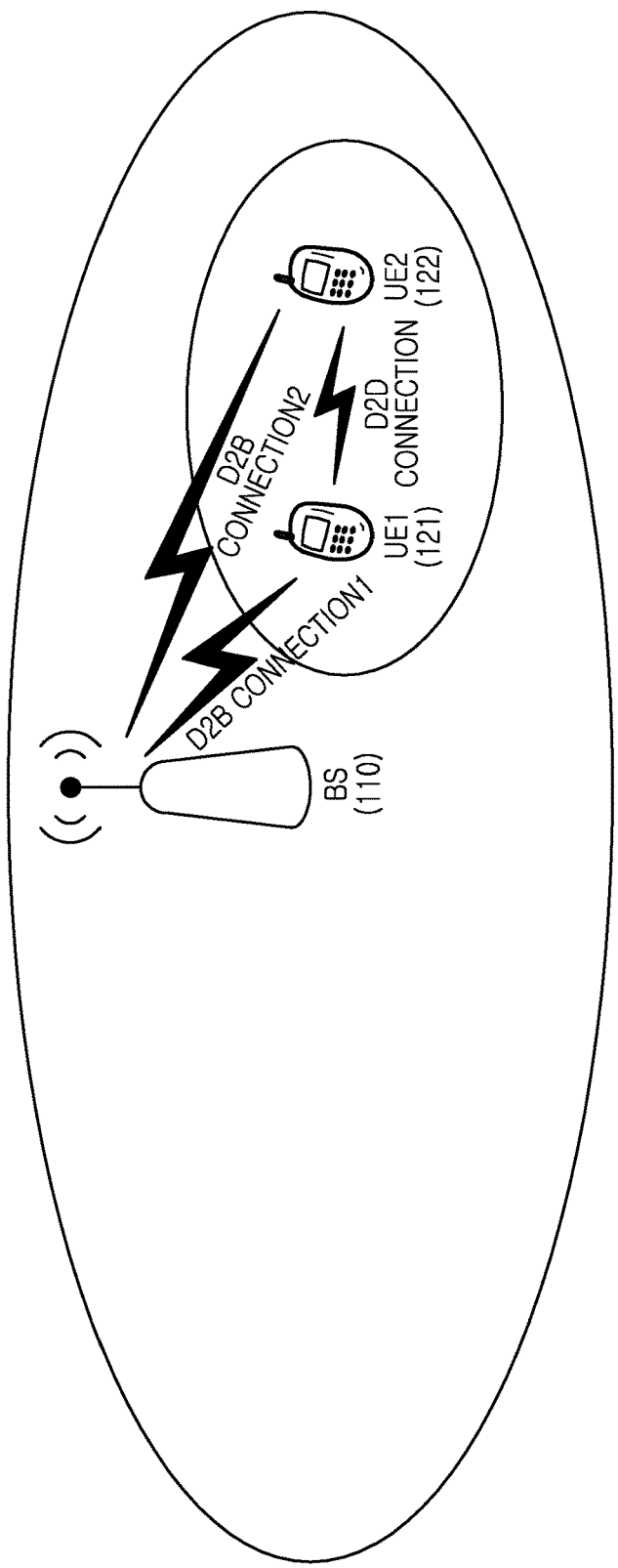
FIG. 1 illustrates Device to Device (D2D) communication in a cellular network according to related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a technique for controlling both of Device to Device (D2D) communication and D2B communication in a wireless communication system.

Mutual influence between a transmit power for the D2D communication and a transmit power for the D2B communication is explained first. To ease the understanding, the transmit power for the D2D communication is referred to as a D2D transmit power, and the transmit power for the D2B communication is referred to as a D2B transmit power.

When resources of a cellular network are used for the D2D communication and a D2D transmitting User Equipment (UE) simultaneously transmits signals to a D2D receiving UE and a Base Station (BS), the D2B transmits signals and the D2D transmits signals are modulated together and transmitted via an antenna. In so doing, the D2B transmit power and the D2D transmit power are individually determined by respective power control methods. The D2D transmit power limits a total transmit power below a maximum transmit power defined by a standard, by taking into account the D2B transmit power. Based on the D2B transmit power and the D2D transmit power finally determined, traffic data is encoded, modulated, and transmitted via the antenna.

The D2D communication based on the cellular network intends to minimize complexity of the existing BS and UE. To this end, a signal processing means such as modulation means for the D2B communication may be shared for the D2D communication. To minimize changes of the exiting D2B communication system according to the D2D communication, the transmit power may be independently controlled, except in the case where the sum of the D2B and D2D transmit powers falls below the maximum transmit power of the UE. The distance difference between the UE and the BS and between the UEs of the D2D communication may greatly increase the differences of the D2B transmit power and the D2D transmit power. Hereafter, to ease the understanding, the difference between the D2B transmit power and the D2D transmit power is referred to as a transmit power difference. For example, a situation of FIG. 2 may be considered.

Figure 2:
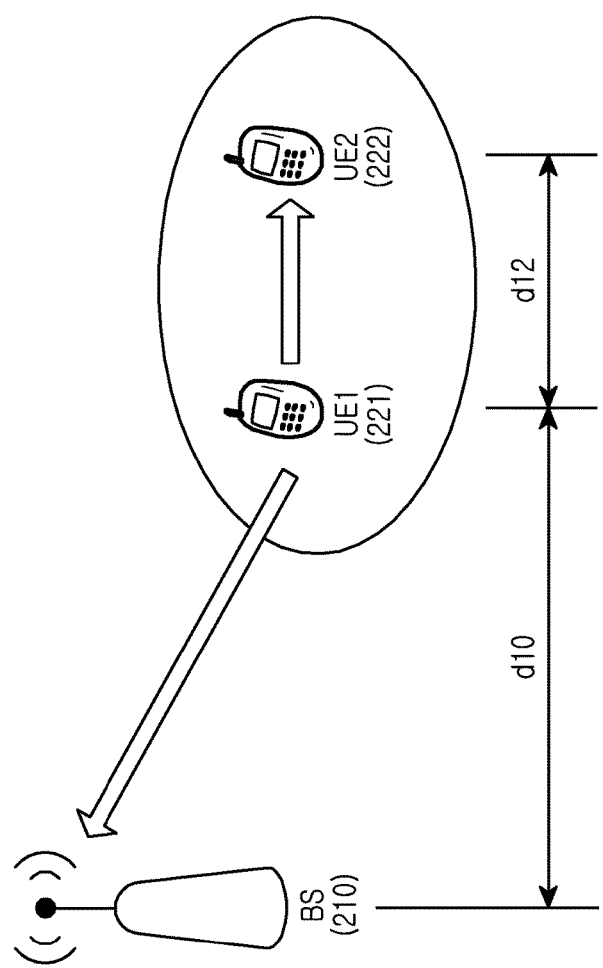
FIG. 2 illustrates User Equipments (UEs) and a Base Station (BS) in a wireless communication system according to an embodiment of the present disclosure.

FIG. 2 depicts UEs and a BS in a wireless communication system according to an embodiment of the present disclosure.

Referring to FIG. 2, a UE1 221 and a UE2 222 are paired for the D2D communication and concurrently the UE1 221 is connected to a BS 210. D12 indicates a distance between the UE1 221 and the UE2 222, and d10 indicates a distance between the UE1 221 and the BS 210. Typically, the transmit power is determined in proportion to the distance between a transmitter and a recipient. Accordingly, when d10 is relatively greater than d12 (d10>>d12), the D2B transmit power from the UE1 221 to the BS 210 is relatively greater than the D2D transmit power from the UE1 221 to the UE2 222. As a result, a huge transmit power difference arises and degrades transmit/receive performance.

The problem caused by the distance difference of the connection of FIG. 2 is referred to a near-far problem. The near-far problem is described in detail by referring to FIGS. 3 and 4.

Figure 3:
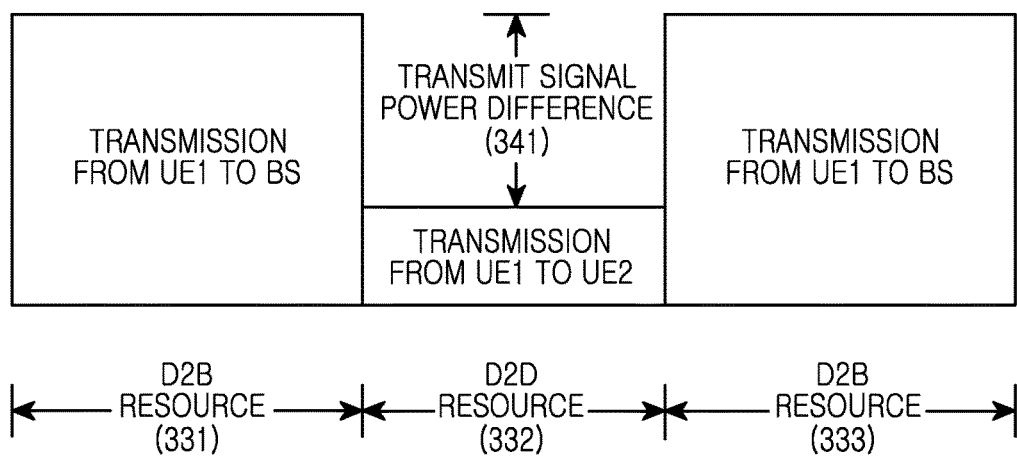
FIG. 3 illustrates a transmit signal spectrum of a UE in a wireless communication system according to an embodiment of the present disclosure.
Figure 4:
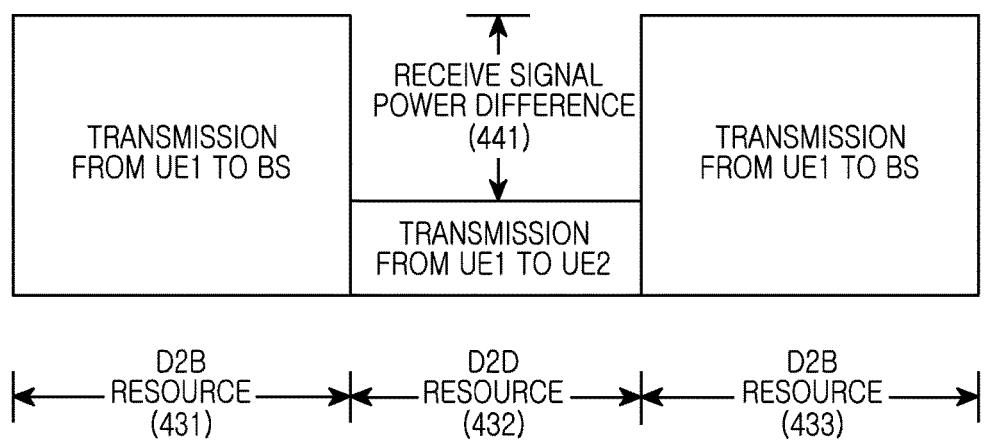
FIG. 4 illustrates a receive signal spectrum of a UE in a wireless communication system according to an embodiment of the present disclosure.

FIG. 3 depicts a transmit signal spectrum of a UE in the wireless communication system according to an embodiment of the present disclosure, and FIG. 4 depicts a receive signal spectrum of the UE in the wireless communication system according to an embodiment of the present disclosure. In FIGS. 3 and 4, a D2B communication is performed using some frequency resources and a D2D communication is performed using a remaining frequency resources during the same time. The resource for the D2B communication and the resource for the D2D communication are allocated orthogonally.

Referring to FIG. 3, the UE1 221 transmits D2B data to the BS 210 using the D2B resources 331 and 333, and transmits D2D data to the UE2 222 using a D2D resource 332.

Referring to FIG. 4, the UE2 222 may listen to the signal from the UE1 221 to the BS 210 using D2B resources 431 and 433, and receive the D2D data using a D2D resource 432. The signals in the D2B resources 431 and 433, which are destined for the BS 210, may act as Adjacent Channel Interference (ACI) on the desired D2D signal of the UE2 222.

When d10 is relatively greater than d12, transmit/receive signal power differences 341 and 441 considerably increase. For example, when the UE1 221 and the UE2 222 travel within a cell boundary and are close to each other, the D2B transmit power rises close to the maximum transmit power (e.g., 23 dBm). The D2D transmit power reduces to a very small value (e.g., below −20 dBm). In this case, the transmit/receive signal power differences 341 and 441 grow.

The simultaneous transmission of the D2B communication and the D2D communication should satisfy both of the signal quality of the D2B transmit signal and the D2D transmit signal. For doing so, a transmitter should be designed based on the transmit signal of the low transmit power, which incurs additional complexity corresponding to the transmit power difference against the existing single D2B communication support transmitter. For example, the design considerations include the number of quantization bits.

Figure 5:
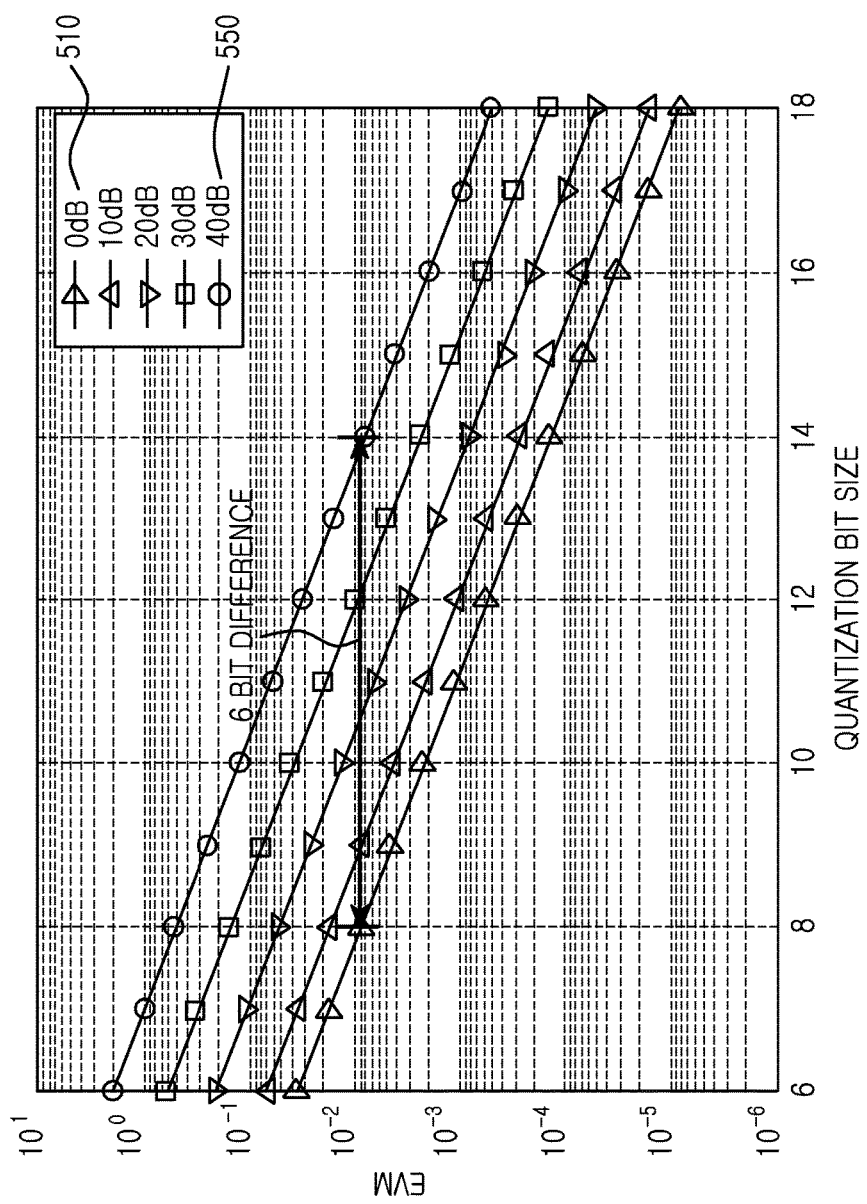
FIG. 5 illustrates Error Vector Magnitude (EVM) based on a number of quantization bits in a wireless communication system according to an embodiment of the present disclosure.

To check the performance degradation according to the transmit power difference, Error Vector Magnitude (EVM) measurement being the transmit signal quality measurement of the UE in the communication standard is shown in FIG. 5.

FIG. 5 depicts the EVM based on a number of quantization bits in a wireless communication system according to an embodiment of the present disclosure.

Referring to FIG. 5, the EVM value based on resolution bits of Digital to Analog Converter (DAC) process is depicted. The quantization bits and the resolution bits indicate how many digital bits are required to represent one analog value.

When the transmit power difference is 40 dB indicated by 550 and 0 dB indicated by 510 in FIG. 5, the same EVM performance requires the additional resolution of 6 bits in the DAC process. When the resolution of the DAC process is determined based on the relatively great D2B transmit power is applied to the D2D signal of the relatively low transmit power, the number of cases of the signal value represented by the D2D signal is greatly reduced. As a result, it is hard to represent the accurate signal value and the signal detection performance of the D2D receiving UE degrades. To overcome the performance degradation in the D2D communication according to the transmit power difference, the additional resolution increase is required. The resolution enhancement increases energy consumption and complexity of the UE.

As discussed above, the performance degradation due to the transmit power difference of the D2B communication and the D2D communication is also applied to the D2D receiving UE. For the huge receive signal power difference 441 of FIG. 4, the resolution of Analog to Digital Converter (ADC) of the D2D receiving UE increases in proportion to the ACI to cancel. Additional ADC resolution bits in proportion to the transmit power difference are required. When the receiver is used in a single mode without the additional bits for the resolution enhancement of ADC process, the D2D communication reception performance may degrade under the huge transmit power difference.

Figure 6:
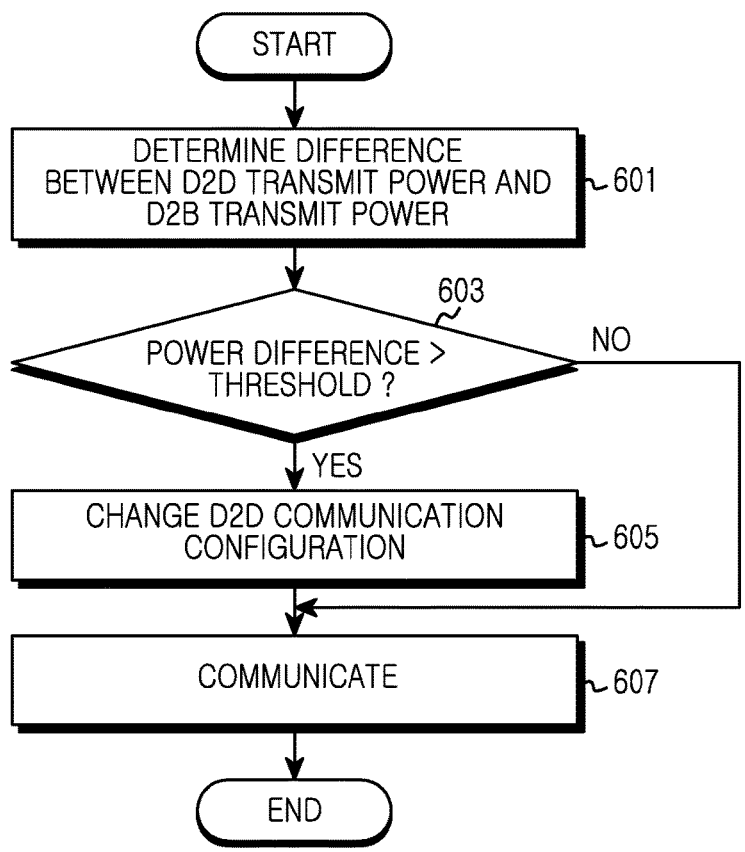
FIG. 6 illustrates operations of a UE in a wireless communication system according to an embodiment of the present disclosure.

FIG. 6 depicts operations of the UE in the wireless communication system according to an embodiment of the present disclosure.

Referring to FIG. 6, the UE may determine the difference between the D2B transmit power and the D2D transmit power in operation 601. Although it is not illustrated, the UE may determine the D2D transmit power and the D2B transmit power based on independent criteria and then determines the transmit power difference. For example, the D2D transmit power may be determined based on a required signal quality, the distance to the other D2D UE, and a channel quality of the other D2D UE. The D2B transmit power may be determined based on the required signal quality, the distance to the BS, and a channel quality of the BS.

In operation 603, the UE may determine whether the transmit power difference exceeds a threshold. The threshold is determined based on the performance degradation caused by the transmit power difference, and may vary according to implementations. For example, the threshold may be determined according to system characteristics, the required communication quality, and intention of a system operator. When the transmit power difference falls below threshold, the UE goes to operation 607.

When the transmit power difference exceeds the threshold, the UE changes a configuration of the D2D communication in operation 605. The present disclosure minimizes the performance degradation by changing the D2D communication configuration, without increasing the computational complexity and the energy consumption by adding the resolution bits of the DAC process. The D2D communication configuration includes at least one of the D2D transmit power, a Modulation and Coding Scheme (MCS) level applied to the D2D data, and the D2D communication. The UE may estimate the D2D communication quality degradation due to the transmit power difference, and changes the D2D communication configuration so as to compensate for the quality degradation. For example, the quality degradation may be estimated based on the added resolution bits required according to the transmit power difference. The change of the D2D communication configuration shall be explained by referring to FIGS. 7 and 8.

After the D2D communication configuration is changed or the transmit power difference falls below the threshold, the UE may perform the D2D communication and the D2B communication in operation 607. When changing the D2D communication configuration, the UE conducts the D2D communication according to the changed configuration (e.g., the transmit power, the MCS level). When determining to temporarily stop the D2D signal transmission, the UE may perform only the D2B communication in the corresponding time period.

Figure 7:
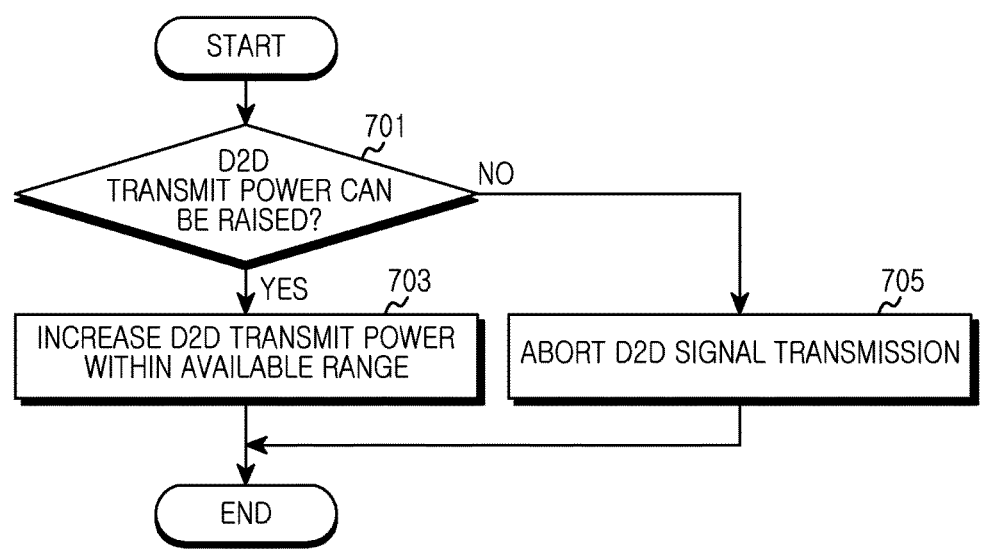
FIG. 7 illustrates a method for changing setting of D2D communication of a UE in a wireless communication system according to an embodiment of the present disclosure.

FIG. 7 depicts a method for changing a configuration of the D2D communication of a UE in a wireless communication system according to an embodiment of the present disclosure. FIG. 7 illustrates operation 605 of FIG. 6 in detail.

Referring to FIG. 7, the UE may determine whether the D2D transmit power may be raised in operation 701. For example, when the sum of the determined D2D transmit power and the determined D2B transmit power exceeds the maximum transmit power, the UE cannot increase the D2D transmit power. The UE may determine whether the sum of the D2D transmit power and the D2B transmit power falls below the maximum transmit power.

When the D2D transmit power may be raised, the UE may increase the D2D transmit power within an available range in operation 703. More specifically, the UE may estimate the D2D communication quality degradation due to the transmit power difference, and determine an additional power offset to compensate for the quality degradation. The UE may limit the power offset such that the sum of the D2D transmit power and the D2B transmit power falls below the maximum transmit power when the power offset is applied. The UE may change the D2D transmit power by adding the determined D2D transmit power and the power offset. Since the signal range grows as the transmit power increases, the lack of the resolution bits is mitigated.

When the increase of the D2D transmit power is infeasible, the UE may abort the D2D signal transmission in operation 705. The abortion of the D2D signal transmission is the temporary interruption in the corresponding time period. The UE may hold the D2D connection and suspends the D2D signal transmission only in the corresponding time period. The downlink communication may operate independently from the transmission. Accordingly, when the D2D resource and the D2B resource are allocated concurrently in the same time period, the new determination may transmit the D2D signal.

Figure 8:
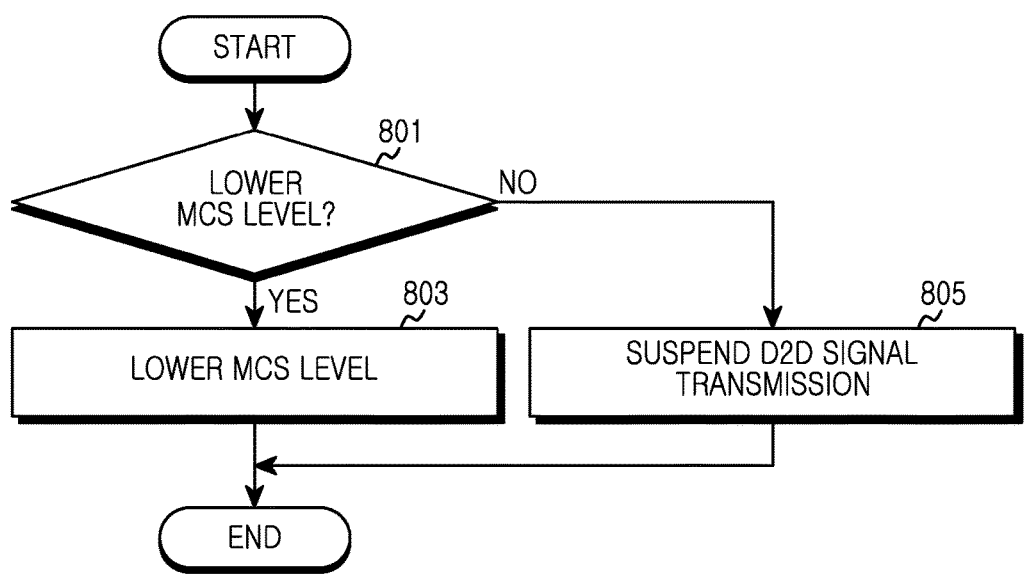
FIG. 8 illustrates a method for changing a D2D communication setting of a UE in a wireless communication system according to another embodiment of the present disclosure.

FIG. 8 illustrates a method for changing a D2D communication configuration of a UE in a wireless communication system according to another embodiment of the present disclosure. FIG. 8 depicts operation 605 of FIG. 6 in detail.

Referring to FIG. 8, the UE may determine whether to lower the MCS level applied to the D2D data in operation 801. For example, when the MCS level is at the minimum level, the MCS level cannot be lowered. The minimum level indicates the most robust MCS level. The UE may determine whether the MCS level determined for the current D2D data is the minimum level.

When the MCS level may be lowered, the UE lowers the MCS level in operation 803. The UE may estimate the D2D communication quality degradation caused by the transmit power difference, and selects the MCS level for compensating for the quality degradation. Since signal candidates to classify are reduced as the MCS level gets lower, the lack of the resolution bits is diminished.

When the MCS level cannot be lowered, the UE may suspend the D2D signal transmission in operation 805. The D2D signal transmission is temporarily suspended in the corresponding time period. Accordingly, when the D2D resource and the D2B resource are allocated concurrently in the same time period, the D2D signal may be transmitted according to the new determination.

Figure 9:
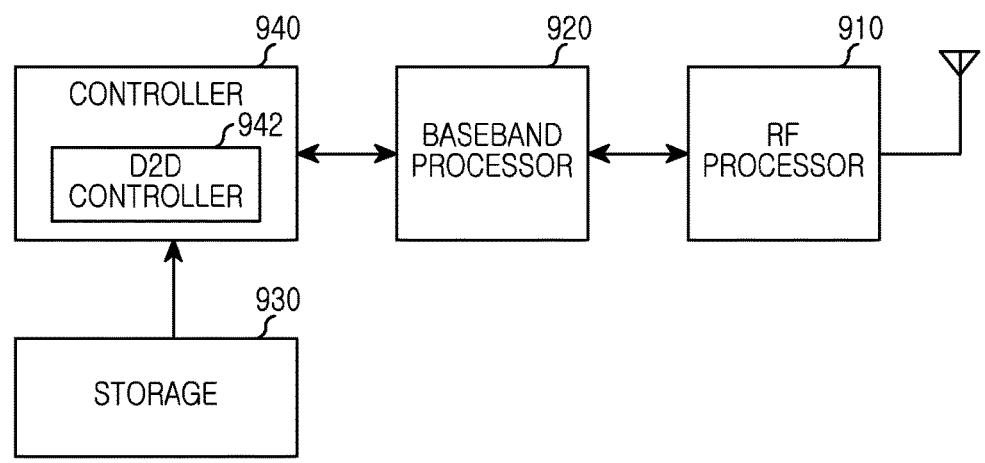
FIG. 9 illustrates the UE in a wireless communication system according to an embodiment of the present disclosure.

FIG. 9 is a block diagram of the UE in a wireless communication system according to an embodiment of the present disclosure.

Referring to FIG. 9, the UE includes a Radio Frequency (RF) processor 910, a baseband processor 920, a storage 930, and a controller 940.

The RF processor 910 may transmit and receive signals over a radio channel through signal band conversion and amplification. The RF processor 910 up-converts a baseband signal fed from the baseband processor 920 to an RF signal, transmits the RF signal over the antenna, and down-converts an RF signal received over the antenna to a baseband signal. For example, the RF processor 910 may include a transmit filter, a receive filter, an amplifier, a mixer, an oscillator, a DAC and an ADC. While the single antenna is depicted in FIG. 9 the UE may include a plurality of antennas. The RF processor 910 may include a plurality of RF chains.

The baseband processor 920 may convert the baseband signal and a bit stream according to a physical layer standard of the system. For example, for the data transmission, the baseband processor 920 may generate complex symbols by encoding and modulating the transmit bit stream. For the data reception, the baseband processor 920 may restore the received bit stream by demodulating and decoding the baseband signal fed from the RF processor 910. For example, in the data transmission based on Orthogonal Frequency Division Multiplexing (OFDM), the baseband processor 920 generates the complex symbols by encoding and modulating the transmit bit stream, maps the complex symbols to subcarriers, and generates OFDM symbols using Inverse Fast Fourier Transform (IFFT) and Cyclic Prefix (CP) addition. For the data reception, the baseband processor 920 may split the baseband signal fed from the RF processor 910 to OFDM symbols, restore the signals mapped to the subcarriers using FFT, and restore the received bit stream by demodulating and decoding the signals. The baseband processor 920 and the RF processor 910 transmit and receive the signals. The baseband processor 920 and the RF processor 910 may be referred to as a transmitter, a receiver, or a transceiver.

The storage 930 may store a basic program for operating the UE, an application program, and data such as configuration information. In particular, the storage 930 may output the stored data according to a request of the controller 940.

The controller 940 may control the operations of the UE. For example, the controller 940 transmits and receives the signals through the baseband processor 920 and the RF processor 910. The controller 940 includes a D2D controller 942 for controlling to compensate for the communication quality degradation due to the transmit power difference between the D2D communication and the D2B communication. For example, the controller 940 controls the UE to carry out the methods of FIGS. 6, 7 and 8. The controller 940 operates as follows.

The controller 940 may determine the difference between the D2D transmit power and the D2B transmit power, and change the D2D communication configuration when the transmit power difference exceeds the threshold. Herein, the D2D communication configuration includes at least one of the D2D transmit power, the MCS level applied to the D2D data, and the D2D communication. More specifically, the controller 940 may estimate the D2D communication quality degradation due to the transmit power difference, and change the D2D communication configuration so as to compensate for the quality degradation. For example, the quality degradation may be estimated based on the required resolution bits based on the transmit power difference. The change of the D2D communication configuration is explained now.

When the transmit power difference exceeds the threshold, the controller 940 may determine whether the D2D transmit power can be increased, and increase the D2D transmit power within the available range when the D2D transmit power may be raised. The controller 940 may estimate the D2D communication quality degradation due to the transmit power difference, and determine the additional power offset to compensate for the quality degradation. The controller 940 may limit the power offset such that the sum of the D2D transmit power and the D2B transmit power falls below the maximum transmit power when the power offset is applied. The controller 940 may change the D2D transmit power by adding the determined D2D transmit power and the power offset. Since the signal range grows as the transmit power increases, the lack of the resolution bits is mitigated.

Alternatively, when the transmit power difference exceeds the threshold, the controller 940 may determine whether the MCS level applied to the D2D data may be lowered, and lower the MCS level when it is possible to. The controller 940 may estimate the D2D communication quality degradation caused by the transmit power difference, and select the MCS level for compensating for the quality degradation. Since the signal candidates to classify reduce as the MCS level gets lower, the lack of the resolution bits is diminished.

Alternatively, when the transmit power difference exceeds the threshold, the controller 940 may temporarily suspends the D2D signal transmission. The controller 940 may determine to abort the D2D signal transmission when it is infeasible to increase the D2D transmit power or to lower the MCS level.

Figure 10:
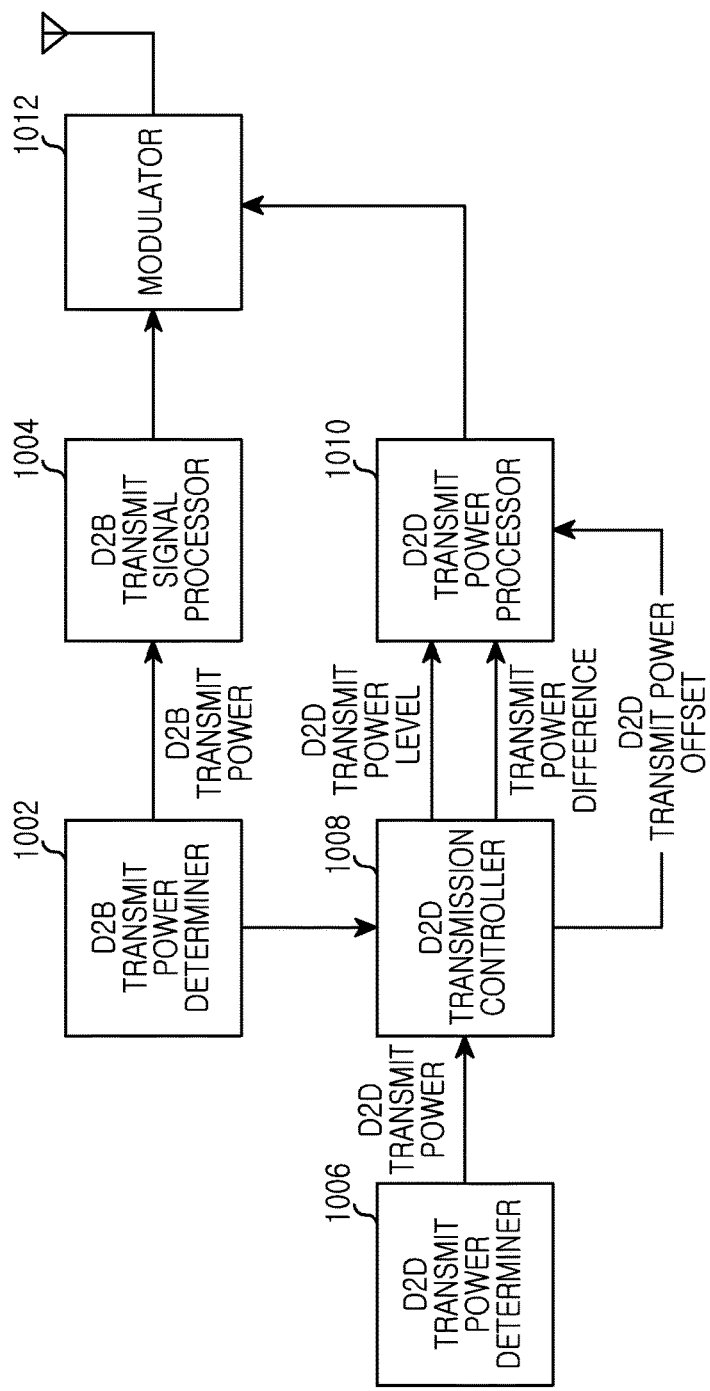
FIG. 10 illustrates a UE in detail in a wireless communication system according to an embodiment of the present disclosure.

FIG. 10 is a detailed block diagram of a UE in a communication system according to an embodiment of the present disclosure.

Referring to FIG. 10, the UE includes a D2B transmit power determiner 1002, a D2B transmit signal processor 1004, a D2D transmit power determiner 1006, a D2D transmission controller 1008, a D2D transmit signal processor 1010, and a modulator 1012.

The D2B transmit power determiner 1002 may determine a transmit power level being the D2B transmit power based on the power control procedure of the BS and transmit power control method from the downlink to the uplink, and provide the transmit power level to the D2B transmit signal processor 1004.

The D2B transmit signal processor 1004 may apply encoding, rate matching, and M-array mapping to the D2B data according to the MCS level. The D2B transmit signal processor 1004 may provide the data and the transmit power level to the modulator 1012.

The D2D transmit power determiner 1006 may determine the transmit power by considering the power control of the D2D. For example, the D2D transmit power determiner 1006 may determine the D2D transmit power based on the required signal quality, the distance to the other D2D UE, and the channel quality of the other D2D UE.

The D2D transmission controller 1008 may limit the D2D transmit power such that the sum of the D2B transmit power and the D2D transmit power falls below the maximum transmit power, by taking into account the maximum transmit power of the UE. To determine the D2D transmit power, the D2D transmission controller 1008 may receive the D2D transmit power and the D2B transmit power from the D2D transmit power determiner 1006 and the D2B transmit power determiner 1002, and determine the D2D transmit power level for selecting the MCS, the D2B/D2D transmit power difference, and the D2D transmit power offset.

The D2D transmit signal processor 1010 may apply encoding, rate matching, and M-array mapping to the D2D data according to the MCS level. The D2D transmit signal processor 1010 may provide the data and the transmit power level to the modulator 1012. In so doing, the D2D transmit signal processor 1010 may adjust the MCS level based on the transmit power difference The modulator 1012 may process the transmit signals for the D2B communication and the D2D communication and transmit the signals with the transmit power in conformity with the transmission method of the system standard.

Figure 11:
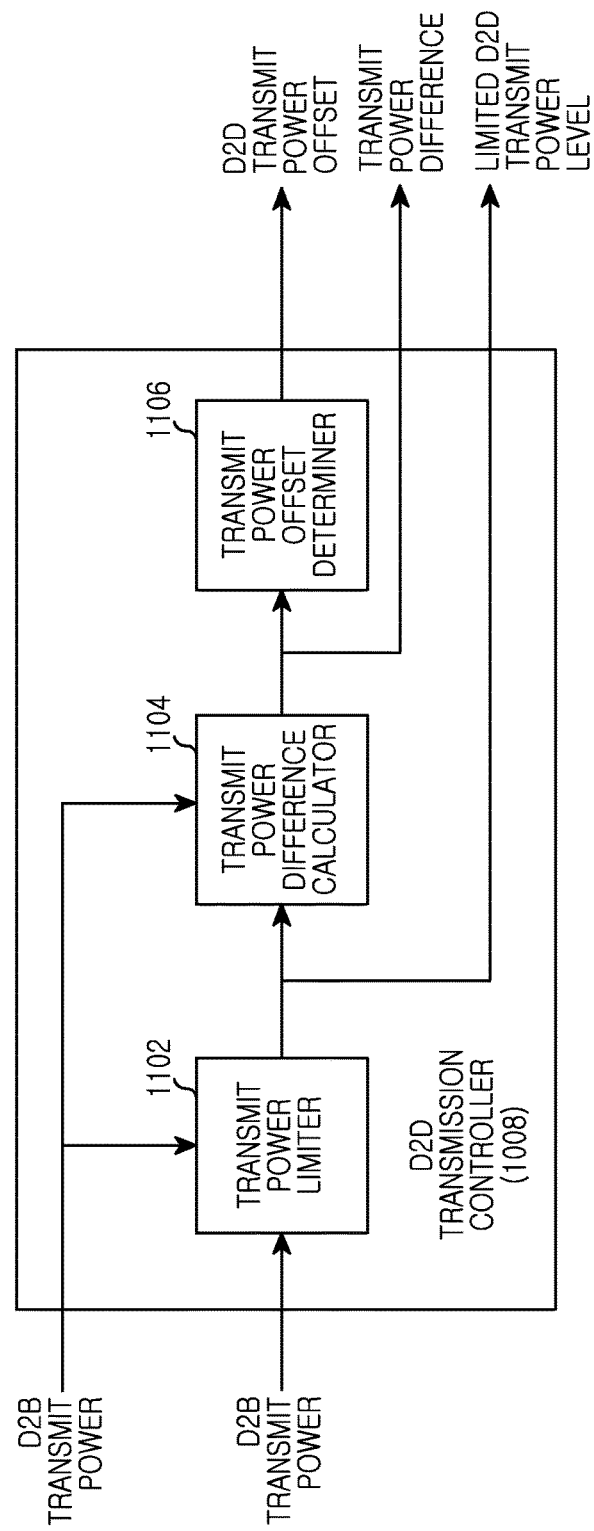
FIG. 11 illustrates a D2D transmission controller in a wireless communication system according to an embodiment of the present disclosure.

FIG. 11 is a detailed block diagram of a D2D transmission controller 1008 in a wireless communication system according to an embodiment of the present disclosure.

Referring to FIG. 11, the D2D transmission controller 1008 includes a transmit power limiter 1102, a transmit power difference calculator 1104, and a transmit power offset determiner 1106.

When the sum of the D2B transmit power and the D2D transmit power is greater than the maximum transmit power of the UE, the transmit power limiter 1102 may determine the final D2D transmit power level by limiting the D2D transmit power.

The transmit power difference calculator 1104 may calculate the transmit power difference which is the difference between the D2B transmit power level and the limited D2D transmit power level.

The transmit power offset determiner 1106 may estimate the transmit signal quality degradation due to the transmit power difference, and determine the transmit power offset for the additional transmit power control so as to compensate for the signal quality degradation. As determining the transmit power offset, when the sum of the D2B transmit power level, the limited D2D transmit power level, and the transmit power offset is greater than the maximum transmit power of the UE, the transmit power offset determiner 1106 may limit the transmit power offset such that the total transmit power falls below the maximum transmit power.

Figure 12:
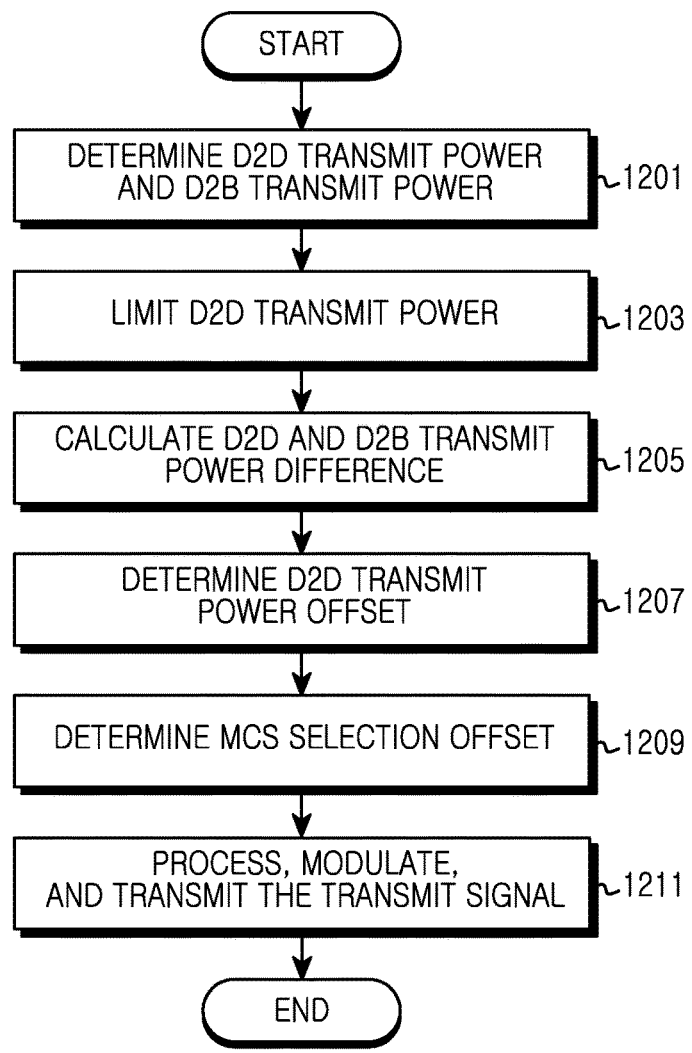
FIG. 12 illustrates operations of a UE in a wireless communication system according to another embodiment of the present disclosure.

FIG. 12 illustrates operations of a UE in a wireless communication system according to another embodiment of the present disclosure.

Referring to FIG. 12, the UE may independently determine a D2D transmit power and a D2B transmit power according to a respective power control procedures in operation 1201. The UE may determine the transmit power being the D2B transmit power based on the power control procedure of the BS and the transmit power control information from the downlink to the uplink. The UE may determine the D2D transmit power based on the required signal quality, the distance to the other D2D UE, and the channel quality of the other D2D UE.

In operation 1203, to determine the D2D transmit power level, the UE may limit the power such that the total transmit power falls below the maximum transmit power $P_T$, by considering the D2B transmit power.

In operation 1205, the UE may calculate the difference between the final D2B transmit power and the limited D2D transmit power.

In operation 1207, the UE may estimate the transmit signal quality degradation due to the transmit power difference, and may determine the additional transmit power offset so as to compensate for the quality degradation. For example, when the total sum of the D2D transmit power and the D2B transmit power is not greater than the maximum transmit power of the UE and the transmit power difference is considerable, the UE may lift the D2D transmit power level by setting the transmit power offset and thus lessen the performance degradation by lowering the transmit power difference. In this case, to satisfy the maximum transmit power limit of the UE, when the total transmit power of the D2B and the D2D exceeds the maximum transmit power limit, the UE may decrease the transmit power offset by the excess.

When the MCS level selected without considering the transmit power difference is applied, the D2D receiving UE is subject to the performance degradation. To compensate for the performance degradation, the UE may determine the offset for the MCS selection in operation 1209, thus achieving the stable D2D communication. For example, when the transmit power difference is considerable and the additional resolution bits are not set for the ADC process and the DAC process, quantization error may be worse in the low-power D2D signal. Accordingly, to reduce the quantization error in the significant transmit power difference, the UE may select the low MCS level so as to mitigate the performance degradation due to the transmit power difference.

In operation 1211, the UE may process the transmit signal by applying the determined D2B transmit power, the limited final D2D transmit power, and the transmit power offset, and modulates and transmits the signal. The UE may modulate the D2B signal and the D2D signal together and emits the signals via the antenna.

Figure 13:
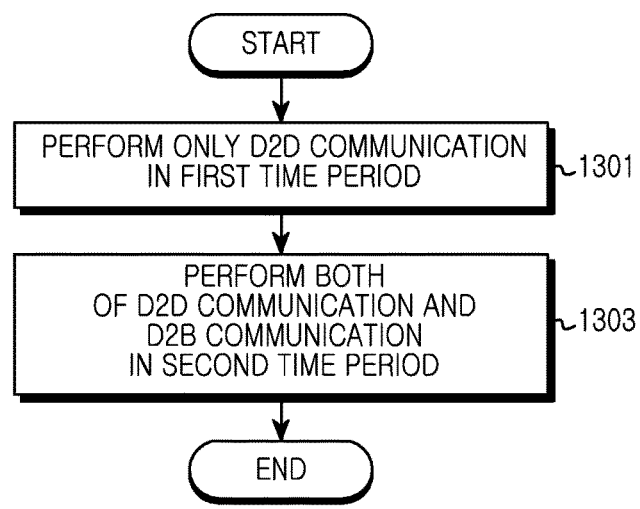
FIG. 13 illustrates operations of a UE in a wireless communication system according to yet another embodiment of the present disclosure.

FIG. 13 illustrates operations of the UE in the wireless communication system according to yet another embodiment of the present disclosure.

Referring to FIG. 13, the UE, which may perform only the D2D communication in the first time period, transmits the signal for the D2D communication to the other UE in operation 1301. In so doing, the UE may determine the configurations of the transmit power and the MCS level based on the distance to the other UE and the channel quality of the other UE, and transmit the generated signal based on the determined configurations.

In operation 1303, the UE may perform both of the D2D communication and the D2B communication in the second time period. The UE may determine the transmit power and the MCS level for the D2D communication and the D2B communication in the independent procedures. In so doing, it is assumed that the D2D communication environment is the same as the first time period and the distance to the BS is relatively longer than the distance to the other UE. The configuration for the D2D communication (e.g., the transmit power, the MCS level) is the same as the configuration of the first time period. When the difference between the transmit power for the D2D communication and the transmit power for the D2B communication exceeds the threshold, the D2D communication configuration may differ from the configuration of the first time period. The UE may transmit the signal for the D2D communication to the other UE and the signal for the D2B communication to the BS. Although the communication environment of the other UE has no change, the configuration different from the first time period is applied to the D2D communication. When the UE transmits the D2B communication signal to the BS and the D2D communication signal to the other UE in the same time period, the D2D communication configuration is determined by taking into account the difference between the transmit power for the D2B communication and the transmit power for the D2D communication. For example, the different configuration includes at least one of the transmit power increase and the MCS level lowering. For example, the different configuration may not temporarily transmit the D2D signal in the second time period.

As set forth above, the present disclosure provides the apparatus and the method for minimizing the performance degradation due to the difference between the transmit power for the D2B communication and the transmit power for the D2D communication in the wireless communication system.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a first user equipment (UE) that supports device to device (D2D) communication in a wireless communication system, the method comprising:
   determining a first modulation and coding scheme (MCS) level for the D2D communication;
   calculating, a difference value between a determined transmit (Tx) power for device-to-base station (D2B) communication and a determined Tx power for the D2D communication;
   when the difference value exceeds a threshold value, estimating a quality degradation for the D2D communication due to transmit power difference, based on at least one resolution bit additionally required in a digital-to-analog (DAC) process according to the calculated difference value;
   determining an offset for MCS selection to compensate for the estimated quality degradation by reducing signal candidates;
   determining a second MCS level for the D2D communication by using the determined offset, wherein the second MCS level indicates a second MCS which is more robust than a first MCS indicated by the first MCS level; and
   transmitting a signal for the D2B communication to a base station and transmitting a signal for the D2D communication according to the determined second MCS level for the D2D communication to a second UE concurrently in a time period.

2. The method of claim 1, further comprising:
   when the difference value does not exceed the threshold value, transmitting a signal for the D2B communication to the base station and transmitting a signal for the D2D communication according to the first MCS level for the D2D communication to the second UE.

3. The method of claim 2, wherein the threshold value is determined based on at least one of a channel quality of the D2D communication and a channel quality of the D2B communication.

4. An apparatus of a first user equipment (UE) that supports device to device (D2D) communication in a wireless communication system, the apparatus comprising:
at least one processor configured to:
    determine a first modulation and coding scheme (MCS) level for the D2D communication,
    calculate a difference value between a determined transmit (Tx) power for device-to-base station (D2B) communication and a determined Tx power for the D2D communication,
    estimate a quality degradation for the D2D communication due to transmit power difference, based on at least one resolution bit additionally required in a digital-to-analog (DAC) process according to the calculated difference value, when the difference value exceeds a threshold, and
    determine an offset for MCS selection to compensate for the estimated quality degradation by reducing signal candidates, and
    determine a second MCS level for the D2D communication by using the determined offset, wherein the second MCS level indicates a second MCS which is more robust than a first MCS indicated by the first MCS level; and
at least one transceiver configured to transmit a signal for the D2B communication to a base station and transmit a signal for the D2D communication according to the second MCS level for the D2D communication to a second UE concurrently in a time period.

5. The apparatus of claim 4, wherein the at least one processor is further configured to:
when the difference value does not exceed the threshold value, transmit a signal for the D2B communication to the base station and transmit a signal for the D2D communication according to the first MCS level for the D2D communication to the second UE.

6. The apparatus of claim 5, wherein the threshold value is determined based on at least one of a channel quality of the D2D communication and a channel quality of the D2B communication.

7. The method of claim 1, wherein the at least one resolution bit indicates at least one added bit required to obtain same error vector magnitude (EVM) performance before and after the difference value exceeds the threshold value, in the DAC process.

8. The apparatus of claim 4, wherein the at least one resolution bit indicates at least one added bit required to obtain same error vector magnitude (EVM) performance before and after the difference value exceeds the threshold value, in the DAC process.

* * * * *